United States Patent [19]

Moore

[11] 4,330,983
[45] May 25, 1982

[54] FLOATING DIVIDER FOR A HARVESTER

[75] Inventor: Paul J. Moore, Garfield, Wash.

[73] Assignee: J. E. Love Company, Garfield, Wash.

[21] Appl. No.: 211,693

[22] Filed: Dec. 1, 1980

[51] Int. Cl.³ .................... A01D 41/12; A01D 45/22; A01D 63/04
[52] U.S. Cl. .................................................. 56/314
[58] Field of Search .................... 56/314, 318, 208

[56] References Cited

U.S. PATENT DOCUMENTS

| | | | |
|---|---|---|---|
| 2,892,298 | 6/1959 | Chaney | 56/314 |
| 3,596,454 | 8/1971 | Kluck | 56/314 |
| 3,885,377 | 5/1975 | Jones | 56/314 |
| 3,967,439 | 7/1976 | Mott | 56/314 |
| 4,193,250 | 3/1980 | Kessens | 56/314 |
| 4,199,927 | 4/1980 | Craig | 56/314 |

FOREIGN PATENT DOCUMENTS

| | | | |
|---|---|---|---|
| 1278492 | 10/1961 | France | 56/314 |
| 360150 | 11/1931 | United Kingdom | 56/314 |

*Primary Examiner*—Jay N. Eskovitz
*Attorney, Agent, or Firm*—Wells, St. John & Roberts

[57] ABSTRACT

A crop divider attachment for a harvester which includes a fixed upright divider extending forwardly from the conventional divider wall at the sides of a transverse frame. A lightweight snout 18 projects forwardly from the fixed divider and has side surfaces which overlap it. The snout 18 is pivotally connected at the forward end of the fixed divider adjacent to the ground surface. It swings beneath a fixed chimney on the stationary divider with minimum physical clearance in which crops might become engaged. Side deflectors shift the disentangled crop toward the center of the header. The snout floats freely, and its downward movement is limited by a flexible length of chain.

5 Claims, 5 Drawing Figures

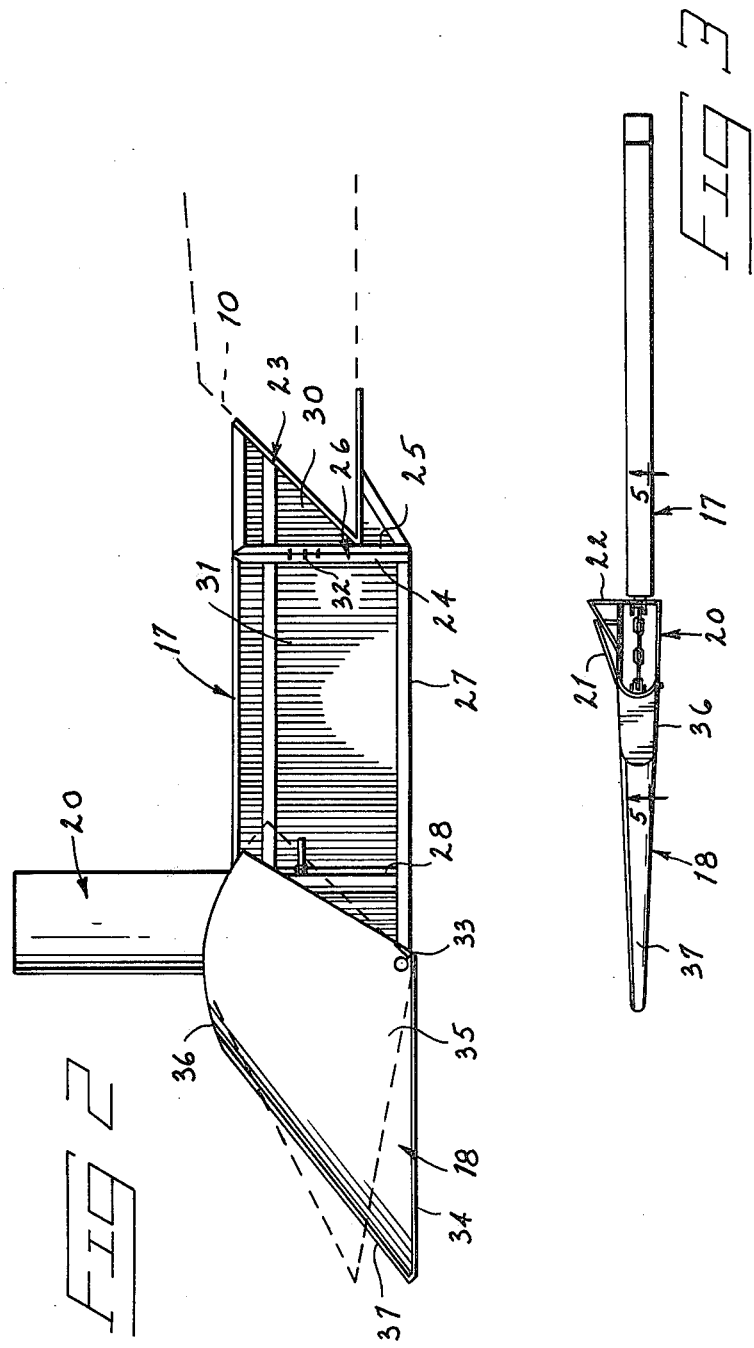

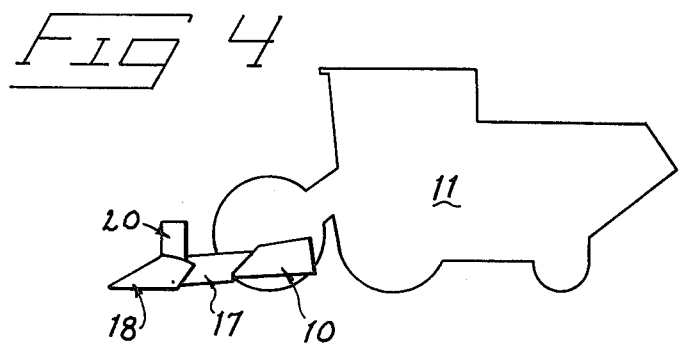
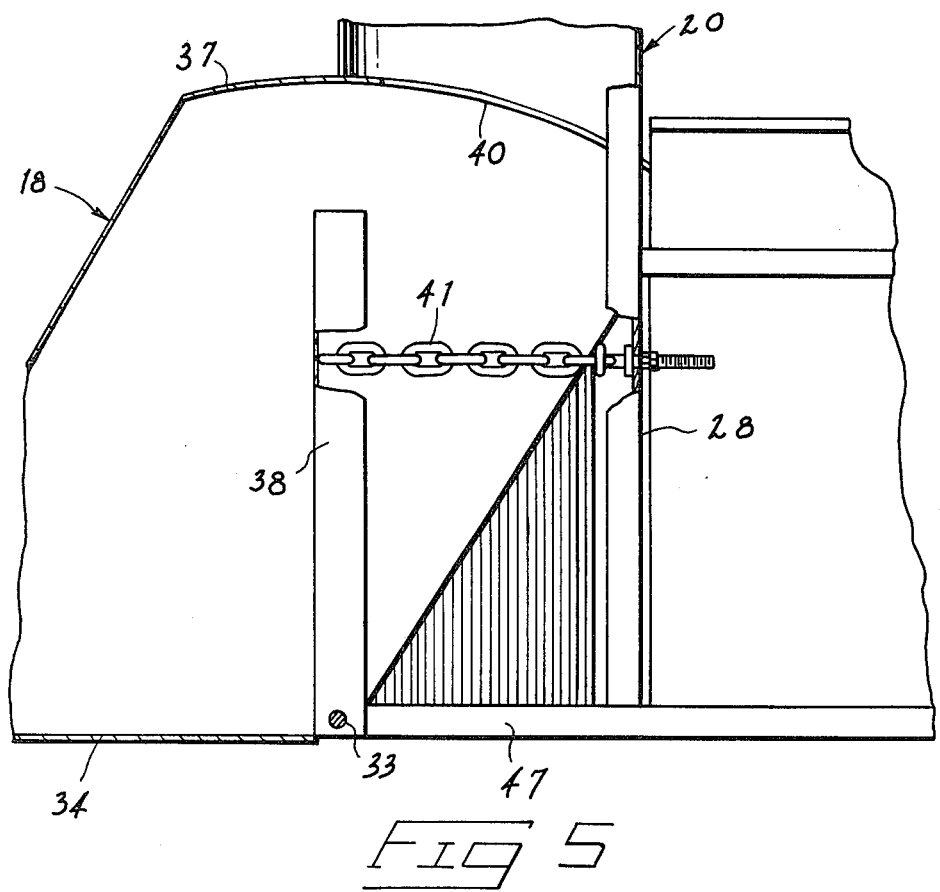

FLOATING DIVIDER FOR A HARVESTER

BACKGROUND OF THE INVENTION

This disclosure relates to a floating divider for harvesters, such as combine headers. The function of divider attachments or assemblies on a harvester is to untangle the vines prior to their engagement by the combine reel and cutter bar. The present apparatus is specifically adapted for the harvesting of crops such as soybeans, where entangled vines must be fed to the combine cutter bar.

Standard dividers typically provided on harvesters such as a combine header simply comprise vertical triangular walls that protrude forwardly from the cutting surfaces a relatively short distance and extend upwardly to approximately the crop height. While such dividers are reasonably effective when harvesting upright crops such as grains, they are not effective in accurately separating or untangling the swath edges of vine crops such as soybeans.

Ineffective division of the crop along the cutting swath of a harvester results in mechanical complications as the vines become entangled at the ends of the harvesting equipment. It also results in tangled masses of the crop being left to one side of the passing harvester and resulting loss of such crops. It further slows down the rate of harvest, since clearing the equipment of such entangled masses of vines is time consuming and risks potential danger to those attempting this task.

Various crop dividers have been proposed in the past. These include stationary dividers as shown in U.S. Pat. No. 3,596,454 and floating divider attachments as illustrated in U.S. Pat. Nos. 2,892,298, 3,885,377 and 3,967,439. These floating arrangements typically have relatively long forward extensions pivoted at the point of attachment on the conventional triangular counterbalancing springs for supporting the extended weight of the divider (see U.S. Pat. Nos. 3,967,439) or are so cumbersome that the divider itself damages a substantial width of the standing crop.

Other existing forms of dividers have been attached to the cutter bar rather than to the header frame. This arrangement attempts to support the divider to "float" in unison with the floating movement of the cutter bar along the ground surface. However, cutter bars are not structurally designed for the support of the added weight imposed upon them by such dividers. They undesirably stress the physical strength of the cutter bar structure and its mounting assembly.

The present apparatus totally eliminates the need for spring loading of a divider while providing an attachment having a floating snout capable of riding along the ground surface for accurate and effective crop division. The movable section of the crop divider is relatively small. It can be constructed with a relatively light total weight. This is accomplished by moving the pivotal connection for the floating divider structure forwardly from the triangular divider wall to which the attachment is mounted. An intermediate fixed divider between the movable snout and the conventional divider wall is joined to the wall and supported as an integral part of it by the usual header support apparatus. A complementary upright chimney on this fixed divider serves to untangle the upper portions of the vines. Because the chimney is fixed, this added height is accommodated without increasing the bulk or weight of the movable floating snout projection.

DESCRIPTION OF THE DRAWINGS

FIG. 2 is an outside vertical elevation of the divider;

FIG. 3 is a top view of the divider shown in FIG. 2;

FIG. 4 is a schematic view illustrating the relative position of the divider on a combine; and FIG. 5 is an enlarged fragmentary sectional view taken along line 5—5 in FIG. 3.

DESCRIPTION OF THE PREFERRED EMBODIMENTS

Figure 1:
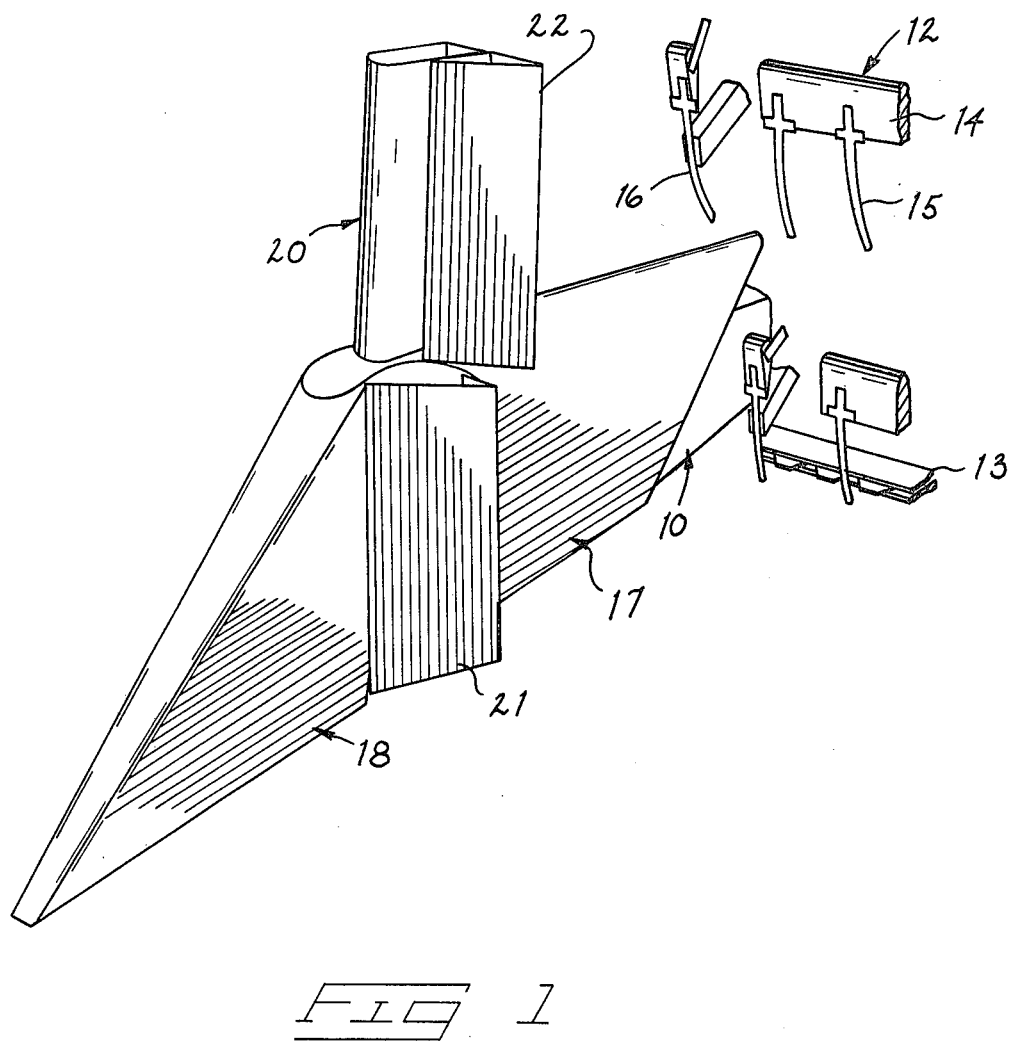
FIG. 1 is a perspective view of the divider mounted on a combine header.

The drawings illustrate the details of the divider as mounted on a conventional combine header used for harvesting of soybeans. It can be applied to any harvester. As can be seen in FIGS. 1, 2 and 4, the present divider is shown mounted as an attachment to a conventional upright divider wall 10 located at the respective ends of the header platform that extends transversely across a combine 11. The divider wall 10 is typically fixed integral with the header frame, which supports the reel 12 and a cutter bar 13 which cooperatively engages and cuts the crop for processing by the combine 11. The reel 12 typically includes a series of transverse bats 14 carrying crop engaging tines 15. The outside reel mechanisms also typically include crop engaging tines shown at 16 (FIG. 1).

It is most important to segregate the vines along the sides of the combine header so as to minimize entanglement of the vines with the mechanisms at the ends of the reel 12. Such a divider mechanism must "float" along the ground surface in order to engage the vines progressively from the ground as the combine 11 moves in a forward direction (to the left as shown in FIG. 4). The floating movement of the divider must not interfere with the reel pickup mechanisms at the ends of the reel 12.

As shown, the divider wall 10 has a generally triangular appearance in elevation. It protrudes just slightly forward from the cutter bar 13 and is generally ineffective in entangling larger vine crops.

The present attachment essentially includes an upright narrow fixed divider 17, a movable divider snout 18 and a fixed upright chimney 20. The movable snout 18 freely floats in engagement with the ground surface to accommodate varying ground contours. The fixed divider 17 spaces the movable snout 18 forwardly from the divider wall 10 to which it is mounted. Chimney 20 disentangles upper portions of the crop. Both the snout 18 and the chimney 20 include inwardly directed deflector panels 21 and 22 that shift the divided crop toward the center of the combine header to improve feeding of the crop to the pickup reel 12 and minimize the crop volume actually engaged by the outside tines 16.

The details of the attachment are shown in FIGS. 2, 3 and 5.

The fixed divider 17 includes a rear mounting frame 23 which is bolted, welded or otherwise fixed to the existing triangular divider wall 10 at each side of the combine header platform. The front edge of the rear mounting frame 23 is presented along an upright angle iron 24 which abuts a similar angle iron 25 that forms the rear end of a divider extension shown generally at 26. This extension 26 includes a horizontal bottom frame member 27 and a front upright frame member 28.

The rear mounting frame 23 has a smooth inner surface presented by a covering of sheet metal shown at 30. This surface is continued forwardly by a similar covering 31 about the inner surface of the extension 26. To reduce total weight and permit access to the framework of the fixed divider 17, its outer surface is uncovered. (See FIG. 2). Since the divider is concerned primarily with guiding of vines inwardly toward the pickup reel 12, covering of its outer surfaces is functionally unnecessary.

The extension 26 is vertically adjustable with respect to the rear mounting frame 23 by a series of supporting bolts 32 releasably joining the abuting flanges of the angle irons 24 and 25. The extension 26 can be shifted upward or downward on the frame 23 depending upon the nature and height of the crop to be harvested and the relative height of the cutter bar and pickup reel required for effective harvesting operations.

The movable divider snout 18 overlaps and is pivotally mounted to the forward end of fixed divider 17 about a transverse axis presented by a supporting bolt 33. The snout is fabricated from sheet metal. It includes a bottom horizontal skid 34, tapered triangular side walls 35, and a forwardly facing upper edge 36 which leads to a curved top surface 37. All of these elements are integrally bent or joined to one another to form a relatively light hollow structure including an upright channel brace 38 pivotally interconnected to the front end of frame member 27 by the pivot bolt 33.

The light sheet metal structure illustrated in the drawings reduces the weight of the snout. This factor, plus its relatively small dimensions, eliminates the need for counterbalancing springs or other mechanisms to achieve the desired "floating" movement of the snout along the ground surface. The smooth upright side walls 35 merge into the forwardly and downwardly inclined upper edge 36 without presenting any obstructions or surfaces on which vine crops might become entangled. Skid 34 is adapted to rest on the ground surface and to ride along it in intimate contact, while conforming to varying ground contour configurations.

Chimney 20 is a stationary hollow tubular member which extends upwardly from the fixed divider 17 at a location longitudinally aligned with and upwardly adjacent to the movable divider snout 18. It overlaps the position and moving path of snout 18 to disentangle upper portions of the vine crops that are engaged by it during forward movement of combine 11.

The lower edge 40 of chimney 20 is arcuately formed about the axis of pivot bolt 33. Similarly, the top surfaces 37 along snout 18 is also centered about this same axis. Minimum physical clearance is provided between edges 40 and surfaces 37 to minimize possible entry of crop materials between the moving snout 18 and the stationary chimney 20. This clearance is maintained throughout the limits of angular movement of snout 18 permitted about the axis of bolt 33 as a result of using a common center for both edges 40 and surfaces 37.

Fixed along the inner surface of the snout 18 is a hollow deflector 21 having a front surface that extends rearwardly and inwardly from a continuation of the snout side walls 35. A similar inwardly directed deflector 22 is fixed along the inner surface of the chimney 20. Deflectors 21 and 22 shift the engaged crop inwardly toward the center of the header for effective handling of the crop by the pickup reel 12 and cutter bar 13.

Motion limiting means is provided between fixed divider 17 and the movable snout 18 so that the divider can be lifted with the header platform when necessary for transport purposes. This motion limiting means is shown as an adjustable length of chain 41 anchored between the channel 38 and the front upright frame member 28 (FIG. 5). Chain 41 does not interfere with the free floating movement of snout 18, but will basically maintain the skid 34 in a position forwardly extending from the bottom frame member 47 of the fixed divider when the header platform is lifted from ground contact.

The present attachment would be utilized in pairs, one divider attachment being mounted to one side of a header platform and the other being mounted to the remaining side. The two attachments would be basically identical to one another, but would be fabricated as mirror images so that the inner covered surfaces of the fixed dividers 17 and the deflectors 21 and 22 are located facing toward the center of the header platform.

In operation, the lightweight snout 18 floats along the ground surface with the lower skid 34 resting in ground contact. Engaged vine crops along the sides of the header platform will be gradually disentangled as they ride upwardly along the front edge 36 of the snout. Outer crop elements will be further separated by engagement with the fixed divider 17. The disentangled crops are subsequently shifted inwardly by deflectors 21 and 22 which effectively enlarge the swath of the divider without substantial ground contact by wide members which would damage a greater crop width along each side of the combine swath.

Various modifications might be made with respect to specific details of the apparatus without deviating from the general structural concepts described above.

What is claimed is:

1. A floating crop divider attachment for a harvester having a transverse frame with opposite upright side walls, said attachment comprising:
    an upright narrow fixed divider having a rear end adapted to be fixed to one side wall of a harvester as a longitudinal extension thereof and extending outwardly to a forward end;
    a movable divider snout overlapping and pivotally mounted to the forward end of the fixed divider about a transverse axis and extending forwardly as a longitudinal extension thereof; said divider snout having smooth upright side walls merging into a forwardly and downwardly inclined upper edge;
    and an upright chimney mounted to said fixed divider and extending upwardly therefrom at a location longitudinally aligned with and upwardly adjacent to the movable divider snout;
    said chimney and movable divider snout having complimentary adjacent edges each centered about said transverse axis.

2. A crop divider attachment as claimed in claim 1 further comprising:
    a deflector fixed to one side wall of the movable divider snout and having an upright forwardly facing surface angularly intersecting said one side wall and protruding outward and rearward therefrom.

3. A crop divider attachment as claimed in claim 1 wherein the fixed divider further includes a longitudinal bottom edge and wherein said transverse axis is directly adjacent said bottom edge.

4. A crop divider attachment as claimed in claim 1 wherein the fixed divider further includes a longitudinal bottom edge and wherein said transverse axis is directly adjacent said bottom edge;

said movable divider snout having a longitudinal bottom edge capable of being arranged about the transverse axis as an extension of the bottom edge of the fixed divider.

5. A crop divider attachment as claimed in claim 1 further comprising:

motion limiting means operably connecting said fixed divider and said movable divider snout for permitting free upward motion of the snout about said axis and for limiting the extent of its downward motion to a preselected angular position relative to said axis.

* * * * *